United States Patent
Schneider (10) Patent No.: US 8,347,109 B2
(45) Date of Patent: Jan. 1, 2013

(54) SECURE SERIAL NUMBER GENERATION

(75) Inventor: James Paul Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 1030 days.

(21) Appl. No.: 12/074,045

(22) Filed: Feb. 28, 2008

(65) Prior Publication Data

US 2009/0220072 A1 Sep. 3, 2009

(51) Int. Cl.
G06F 21/00 (2006.01)
(52) U.S. Cl. .............................. 713/189; 380/28; 705/56
(58) Field of Classification Search .................... 380/28; 713/189; 705/56
See application file for complete search history.

(56) References Cited

U.S. PATENT DOCUMENTS

| | | | | |
|---|---|---|---|---|
| 6,134,659 A * | 10/2000 | Sprong et al. | ................ | 713/190 |
| 6,169,976 B1 * | 1/2001 | Colosso | .......................... | 705/59 |
| 6,704,872 B1 * | 3/2004 | Okada | .......................... | 713/194 |
| 7,085,742 B2 * | 8/2006 | Ho et al. | .......................... | 705/57 |
| 7,249,383 B1 * | 7/2007 | McCully et al. | ................ | 726/28 |
| 7,433,710 B2 * | 10/2008 | Bodnar et al. | ............. | 455/556.1 |
| RE42,134 E * | 2/2011 | Chiu | ............................. | 708/250 |
| 2002/0044651 A1 * | 4/2002 | Tuvell | ............................. | 380/37 |
| 2002/0174341 A1 * | 11/2002 | Logue et al. | ................. | 713/179 |
| 2003/0221107 A1 * | 11/2003 | Kang | ............................. | 713/176 |
| 2006/0184799 A1 * | 8/2006 | Seo et al. | ....................... | 713/182 |
| 2008/0189549 A1 * | 8/2008 | Hughes | ........................ | 713/171 |
| 2008/0285758 A1 * | 11/2008 | Chuprov et al. | ............. | 380/278 |

FOREIGN PATENT DOCUMENTS

JP 2006350693 A * 12/2006

* cited by examiner

*Primary Examiner* — Michael Pyzocha
(74) *Attorney, Agent, or Firm* — Lowenstein Sandler PC (57) ABSTRACT

An apparatus and a method for generating serial numbers is described. In one embodiment, a block cipher encrypter encrypts an application identifier and a sequence of random numbers to generate a signature. The block cipher encrypter is associated with a serial number key. The application identifier, the sequence of random numbers, and the signature are concatenated to generate a serial number. An encoder encodes the serial number into a string.

22 Claims, 7 Drawing Sheets

SECURE SERIAL NUMBER GENERATION

TECHNICAL FIELD

Embodiments of the present invention relate to computing systems, and more particularly, to generating and validating serial numbers.

BACKGROUND

Software piracy is a major concern of software developers. Huge monetary revenue losses are attributed to the illegal copying and use of marketed software products. Protection for software products can take many forms. One popular form is the use of embedded code within the software product that generally makes it difficult to operate code that has been illegally copied. Although these type of software based code protections are useful to inhibit the unskilled software thief, well trained software hackers are merely slowed down by such protections. Indeed, there are several commercially available tools available on the Internet that can assist software hackers to reverse engineer code so that patches or other work-arounds may be devised to overcome the software based protections. Therefore, the currently available software based code protections are becoming less and less effective in preventing unauthorized use of commercially available software. However, software based code protections do work to some level to protect against piracy and are effective against some would-be software pirates.

Thus, a need exists for a technique for protecting software that leverages off of the software code protection concept, but also answers the problem of the intelligent thief who would reverse engineer the code and inhibit those protections.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for generating serial numbers. In one embodiment, a block cipher encrypter encrypts an application identifier and a sequence of random numbers to generate a signature. The block cipher encrypter is associated with a serial number key. The application identifier, the sequence of random numbers, and the signature are concatenated to generate a serial number. An encoder encodes the serial number into a string.

Figure 1:
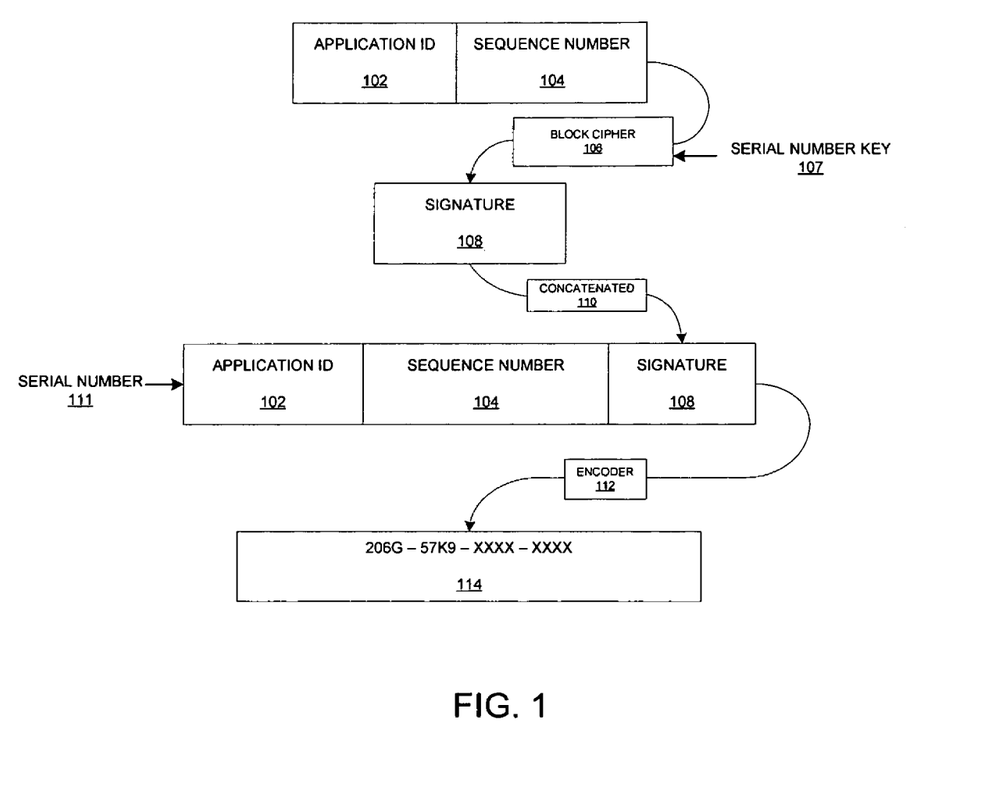
FIG. 1 is a block diagram illustrating one embodiment of a process for generating a secure serial number.

FIG. 1 is a block diagram illustrating one embodiment of a process for generating a secure serial number. A package-specific identifier, such as application identifier 102, identifies the application or software sought to be protected. In one embodiment, the size of application identifier 102 consists of 128 bits. Random bits, such as a sequence of random numbers 104 may be generated and combined with application identifier 102. In one embodiment, the size of sequence of random numbers 104 consists of 128 bits. Application identifier 102 and sequence of random numbers 104 are concatenated. A block cipher 106 is associated with a serial number-key is run on the resulting concatenated string to generate a signature string 108. Signature string 108 is concatenated with application identifier 102 and sequence of random numbers 104 to produce a serial number 111. An encoder 112 encodes the serial number 111 as a serial number string 114. In one embodiment, encoder 112 uses a Base 32 ASCII encoder.

In accordance with another embodiment, another encryption means can be applied on the concatenated string of application identifier 102 and sequence of random numbers 104 to generate the signature string 108. For example, other encryption means include but are not limited to public key cryptography, signature algorithm among others. Those of ordinary skills in the art will recognize that other encrypting methods may be applied on the concatenated string of application identifier 102 and sequence of random numbers 104.

Figure 2:
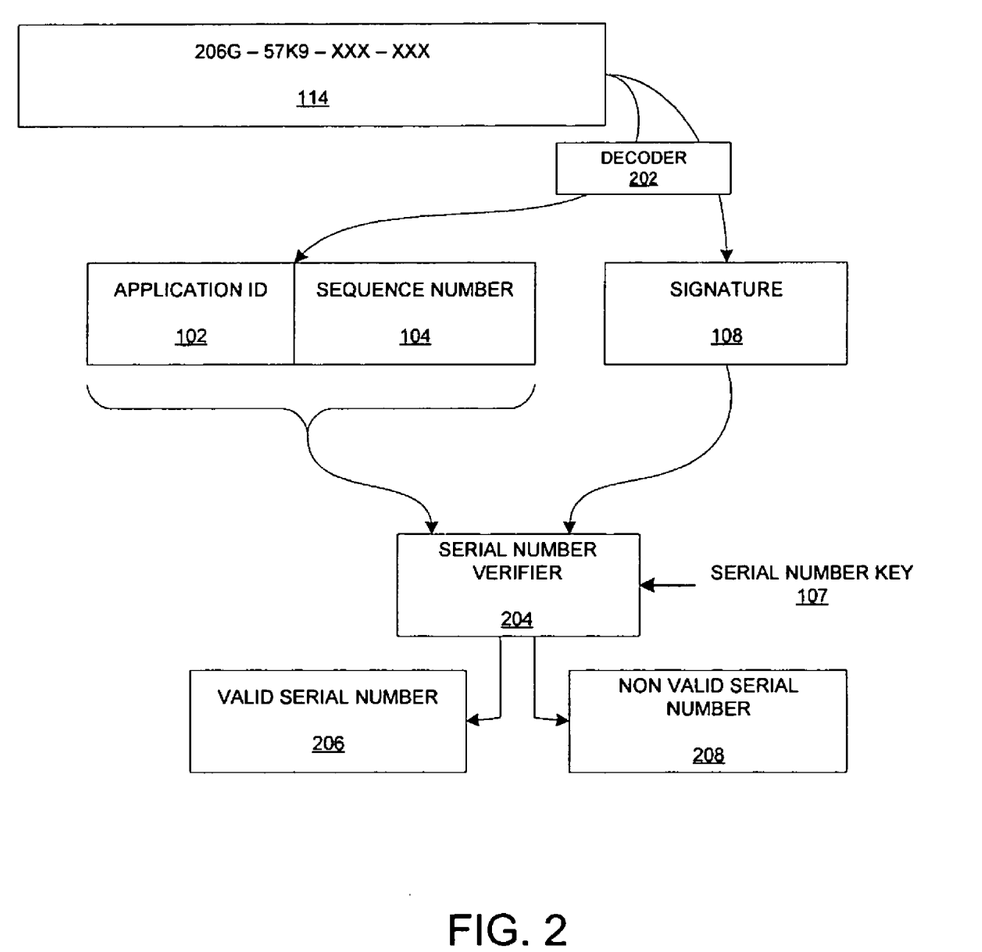
FIG. 2 is a block diagram illustrating one embodiment of a process for verifying the validity of a serial number.

FIG. 2 is a block diagram illustrating one embodiment of a process for verifying the validity of a serial number. A decoder 202 decodes serial number string 114 into application identifier string 102, sequence number string 104, and signature 108. Decoder 202 may include, for example, a Base 32 ASCII decoder. Application identifier string 102, sequence number string 104, and signature 108 are fed into a serial number verifier 204.

A serial number verifier 204 has access to the serial number key which can either be stored in the application (either encrypted or obfuscated) or on a separate server. If the serial number key 111 is stored on a separate server, the application can either rely on the server to validate it, or the application can request that the server encrypt the identifier and random bit, and uses the resulting key to verify the encrypted block. Serial number verifier 204 compares a sample signature generated by encrypting application identifier string 102 and sequence number string 104 with signature 108. If there is a match, the serial number string 114 is validated at 206. Otherwise, the serial number string 114 is not valid at 208.

In accordance with another embodiment, serial number verifier 204 uses a decryption means based on the encryption method selected to encrypt the concatenated string of application identifier 102 and sequence of random numbers 104. For example, if a public key cryptography was used to encrypt, serial number verifier 204 would be based on that respective encryption method.

Figure 3:
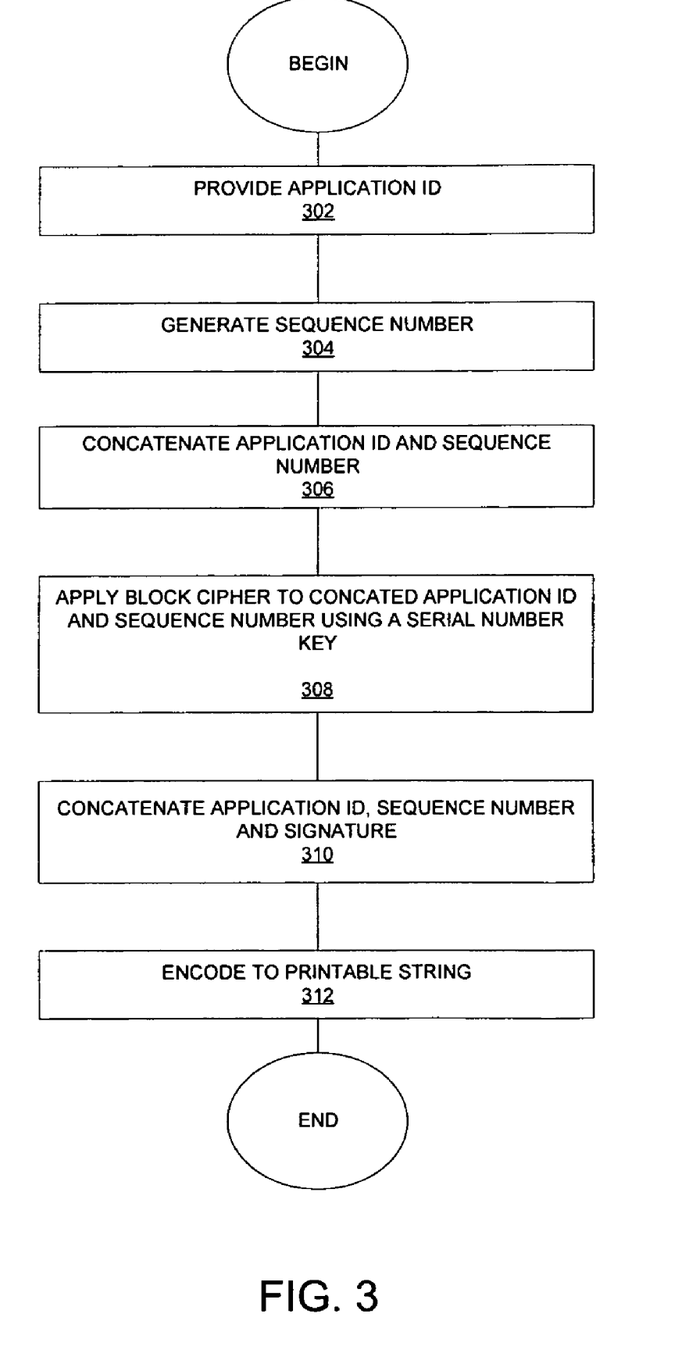
FIG. 3 is a flow diagram illustrating one embodiment of a method for generating a secure serial number.

FIG. 3 is a flow diagram illustrating one embodiment of a method for generating a secure serial number. At 302, an application identifier is provided. At 304, a random bits generator generates a sequence of random numbers. At 306, the application identifier and the sequence of random numbers are concatenated. At 308, a block cipher encrypts the concatenated application identifier and sequence of random numbers to generate a signature string. The block cipher is associated with a serial number key. At 310, the application identifier, the sequence of random numbers, and the signature string are concatenated. At 312, the concatenated string of application identifier, sequence of random numbers, and signature is encoded to a printable string using, for example a Base-32 ASCII encoder).

Figure 4:
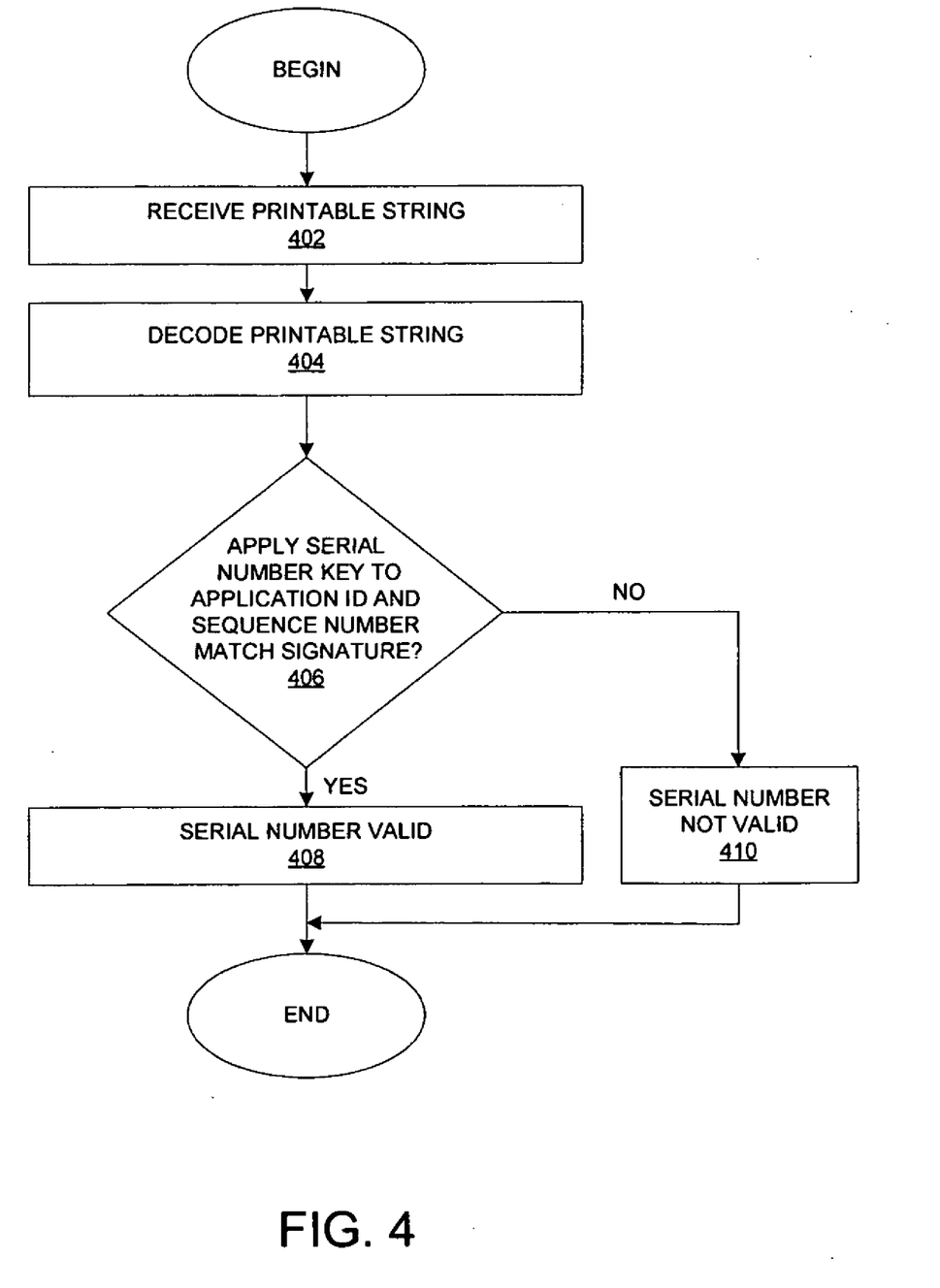
FIG. 4 is a flow diagram illustrating one embodiment of a method for verifying the validity of a serial number.

FIG. 4 is a flow diagram illustrating one embodiment of a method for verifying the validity of a serial number. At 402, a serial number string is provided. The serial number string may have been encoded with, for example, a Base-32 ASCII encoder. At 404, the serial number string is decoded using, for example, a Base-32 decoder to generate a concatenated string of application identifier, sequence of random numbers, and signature. At 406, a serial number verifier uses a serial number key to encrypt the application identifier, sequence of random numbers to generate a sample signature. At 406, the sample signature is compared with the signature from the serial number string to determine the validity of the serial number string. In particular, if the sample signature matches the signature, the serial number string is found to be valid at 408. On the other hand, if the application identifier does not match the application in which the serial number string is being used, or if the sample signature does not match the signature, the serial number string is found to be invalid at 410.

In one embodiment, a validation application validates the signature by checking the application ID, and ensuring that the signature matches the application ID and sequence number. The signer is presumably using some form of ECC signatures (e.g. elliptic curve DSA). For a reasonable serial number size, (40 characters or less), the total size can be at most 200 bits. For 262,144 different application IDs, and 1,073,741,824 potential different serial numbers, this leaves 152 bits for the signature, which provides roughly the same security as a symmetric cipher with a 48 bit key. Those of ordinary skills in the art will recognize that other cryptographic means may be used such as public key cryptography and signature algorithms.

Figure 5:
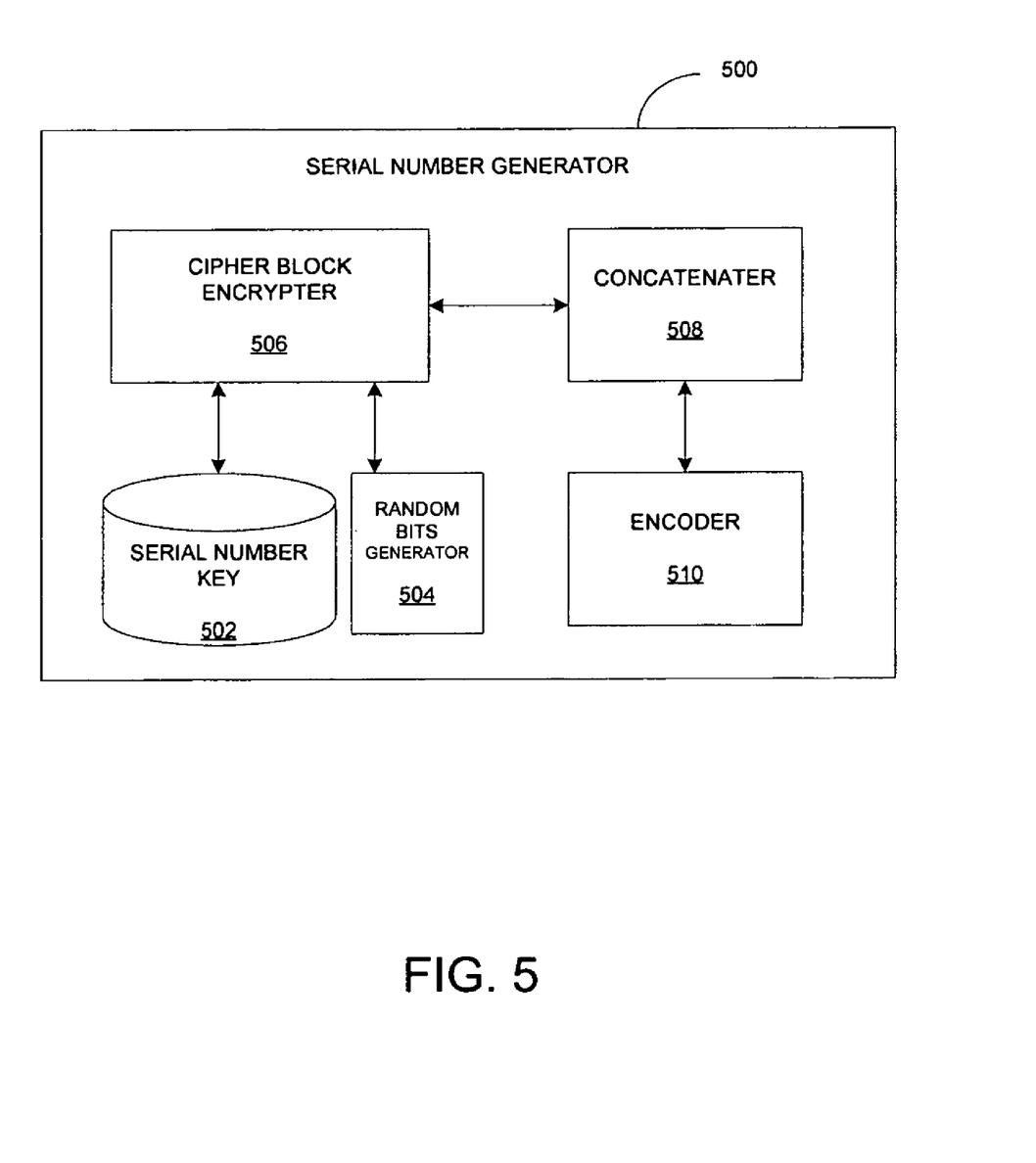
FIG. 5 is a block diagram illustrating one embodiment of secure serial number generator.

FIG. 5 is a block diagram illustrating one embodiment of secure serial number generator 500. The serial number generator 500 includes a serial number key 502, a random bits generator 504, a cipher block encrypter 506, a concatenater 508, and an encoder 510.

Random bits generator 504 generates a sequence of random numbers. Cipher block encrypter 506 encrypts an application identifier and the sequence of random numbers with the serial number key 502 to generate a signature.

In accordance with another embodiment, another encryption means can be applied on the concatenated string of the application identifier and the sequence of random numbers to generate the signature string. For example, other encryption means include but are not limited to public key cryptography, signature algorithm among others. Those of ordinary skills in the art will recognize that other encrypting methods may be applied on the concatenated string of application identifier and the sequence of random numbers.

Concatenater 508 concatenates the application identifier, the sequence of random numbers, and the signature to generate a serial number. Encoder 510 encodes the serial number using for example, Base-32 ASCII coding.

In one embodiment, the application identifier and the sequence of random numbers each include a binary string. The size of the application identifier, the sequence of random numbers, and the serial number key are the same.

Figure 6:
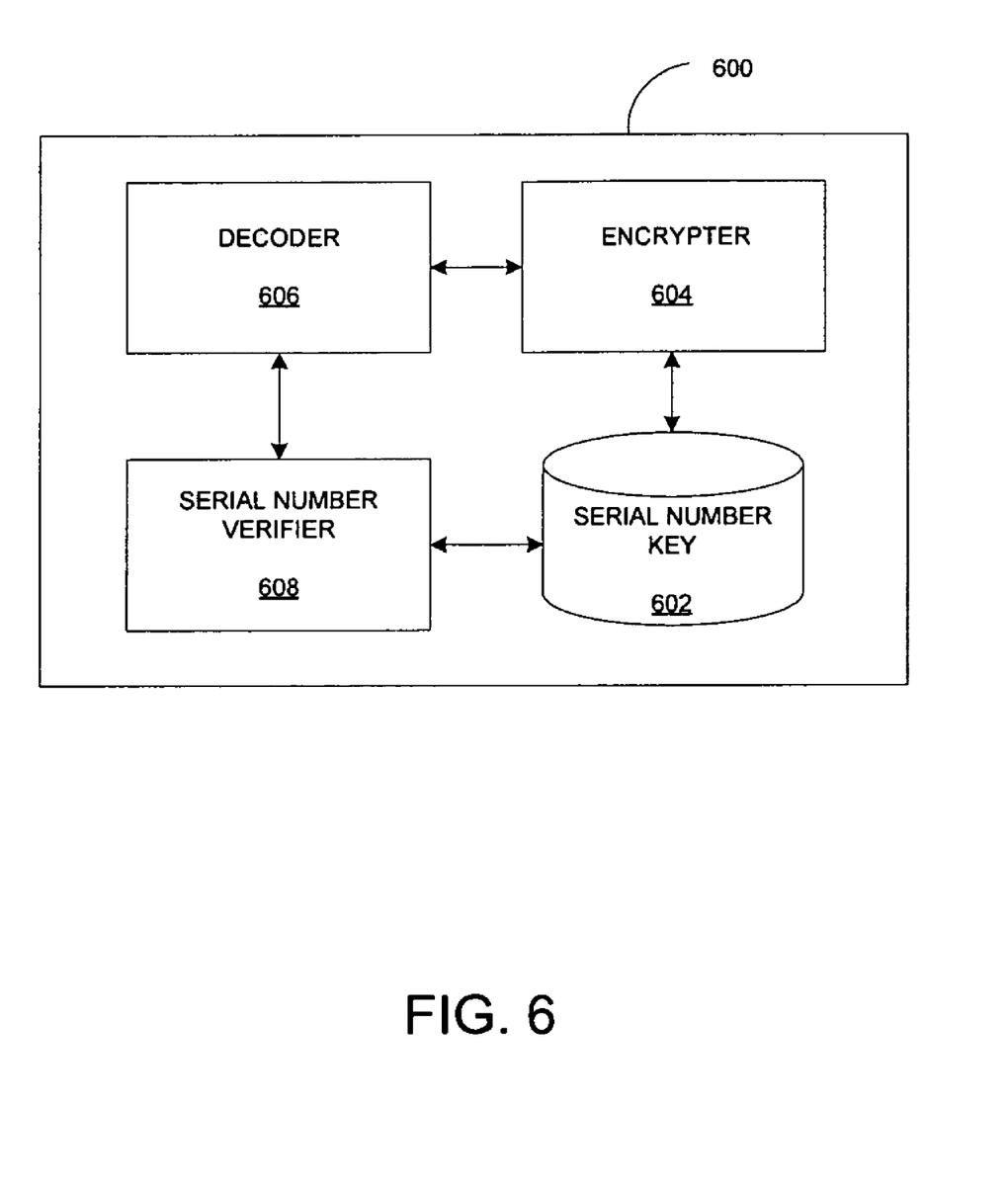
FIG. 6 is a block diagram illustrating one embodiment of a serial number verifier.

FIG. 6 is a block diagram illustrating one embodiment of a serial number validator 600. Serial number validator 600 includes a serial number key 602, an encrypter 604, a decoder 606, and a serial number verifier 608. Decoder 606 decodes a provided serial number string to identify an application identifier, a sequence of random numbers, and a signature. Decoder 606 may be based on a Base-32 ASCII coding.

In accordance with another embodiment, decoder 606 uses a decryption means based on the encryption method selected to encrypt the concatenated string of application identifier and the sequence of random numbers. For example, if a public key cryptography was used to encrypt, serial number verifier would be based on that respective encryption method.

Encrypter 604 encrypts the application identifier and the sequence of random numbers with a block cipher associated with serial number key 602 to generate a sample signature. Serial number verifier 608 compares the sample signature with the signature to determine a validity of the serial number. In particular, if the sample signature matches the signature, the serial number string is found to be valid. On the other hand, if the application identifier does not match the application in which the serial number string is being used, or if the sample signature does not match the signature, the serial number string is found to be invalid.

Figure 7:
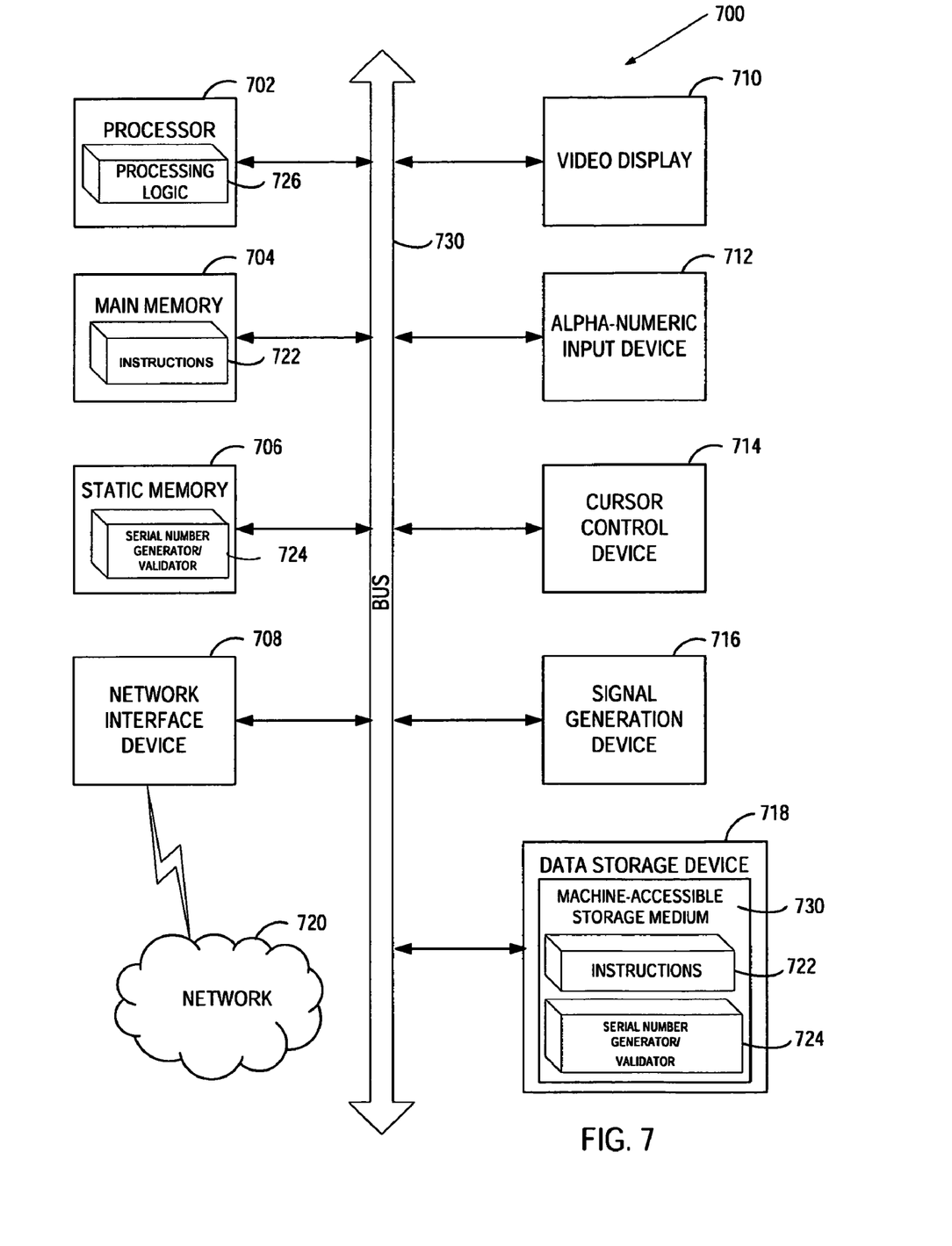
FIG. 7 is a block diagram illustrating an example of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

The machine-accessible storage medium 730 may also be used to store a serial number generator and validator 724 as presently described. The serial number generator and validator 724 may also be stored in other sections of computer system 700, such as static memory 706.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

The above serial number generator could be used to provide serial number information while embedding minimal state (the only thing necessary to validate the serial number is the serial number key). Also, since the identification string cannot be forged in cases where the key is not available (either using an encrypted serial number key or using a serial number key server). It can be used for things like capabilities; one serial number is sold for x dollars giving a first set of functionality. However, another serial number may be sold for more to get additional functionality. In one embodiment, the serial number validator would be embedded in the software application being sought to be used.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
concatenating an application identifier and a sequence of random numbers to create a first concatenated string;
generating a signature string by encrypting the first concatenated string comprising the application identifier and the sequence of random numbers using a block cipher that is associated with a serial number key;
generating a serial number by concatenating the signature string with the application identifier and the sequence of random numbers, wherein concatenating the signature string with the application identifier and the sequence of random numbers creates a second concatenated string; and
encoding the second concatenated string comprising the signature string, the application identifier, and the sequence of random numbers to encode the serial number.

2. The computer-implemented method of claim 1 wherein the application identifier and the sequence of random numbers each include a binary string.

3. The computer-implemented method of claim 2 wherein a size of the application identifier, the sequence of random numbers, and the serial number key are the same.

4. The computer-implemented method of claim 3 wherein encoding further comprises:

encoding the second concatenated string comprising the signature string, the application identifier, and the sequence of random numbers with a base-32 ASCII encoder.

5. The computer-implemented method of claim 1 further comprising:
decoding the serial number to generate a concatenated string comprising an application identifier, a sequence of random numbers, and a signature;
generating a sample signature by encrypting the application identifier and the sequence of random numbers with the block cipher associated with the serial number key; and
comparing the sample signature that is generated by encrypting the application identifier and the sequence of random numbers with the signature that is generated by decoding the serial number to determine a validity of the serial number.

6. A non-transitory computer-accessible storage medium including data that, when accessed by a computer, cause the computer to perform a method comprising:
concatenating an application identifier and a sequence of random numbers to create a first concatenated string;
generating a signature string by encrypting the first concatenated string comprising the application identifier and the sequence of random numbers using a block cipher that is associated with a serial number key;
generating a serial number by concatenating the signature string with the application identifier and the sequence of random numbers, wherein concatenating the signature string with the application identifier and the sequence of random numbers creates a second concatenated string; and
encoding the second concatenated string comprising the signature string, the application identifier, and the sequence of random numbers to encode the serial number.

7. The non-transitory computer-accessible storage medium of claim 6 wherein the application identifier and the sequence of random numbers each include a binary string.

8. The non-transitory computer-accessible storage medium of claim 7 wherein a size of the application identifier, the sequence of random numbers, and the serial number key are the same.

9. The non-transitory computer-accessible storage medium of claim 8 wherein encoding further comprises:
encoding the second concatenated string comprising the signature string, the application identifier, and the sequence of random numbers with a base-32 ASCII encoder.

10. The non-transitory computer-accessible storage medium of claim 6 wherein the method further comprises:
decoding the serial number to generate a concatenated string comprising an application identifier, the sequence of random numbers, and the signature;
generating a sample signature by encrypting the application identifier and the sequence of random numbers with the block cipher associated with the serial number key; and
comparing the sample signature that is generated by encrypting the application identifier and the sequence of random numbers with the signature that is generated by decoding the serial number to determine a validity of the serial number.

11. A system comprising:
a memory;
a processing device coupled to the memory;
a random bits generator executed from the memory by the processing device to generate a sequence of random numbers;
a cipher block encrypter executed from the memory by the processing device to generate a signature string by encrypting a first concatenated string comprising an application identifier and the sequence of random numbers using a block cipher that is associated with a serial number key;
a concatenater executed from the memory by the processing device to concatenate the application identifier and the sequence of random numbers to create the first concatenated string, and to generate a serial number by concatenating the signature string with the application identifier and the sequence of random numbers, wherein concatenating the signature string with the application identifier and the sequence of random numbers creates a second concatenated first string; and
an encoder executed from the memory by the processing device to encode the second concatenated string comprising the signature string, the application identifier, and the sequence of random numbers to encode the serial number.

12. The system of claim 11 wherein the application identifier and the sequence of random numbers each include a binary string.

13. The system of claim 12 wherein the size of the application identifier, the sequence of random numbers, and the serial number key are the same.

14. The system of claim 13 wherein the encoder is configured to encode the second concatenated string comprising the signature string, the application identifier, and the sequence of random numbers with a base-32 ASCII encoder.

15. A system comprising:
a memory;
a processing device coupled to the memory;
a decoder executed from the memory by the processing device to decode a serial number to generate a concatenated string comprising an application identifier, a sequence of random numbers, and a signature;
an encrypter executed from the memory by the processing device to generate a sample signature by encrypting the application identifier and the sequence of random numbers with a block cipher associated with a serial number key; and
a serial number verifier executed from the memory by the processing device to compare the sample signature that is generated by encrypting the application identifier and the sequence of random numbers with the signature that is generated by decoding the serial number to determine a validity of the serial number.

16. The system of claim 15 wherein the serial number verifier is configured to compare the application identifier to an identifier of the application associated with the serial number to determine the validity of the serial number.

17. The system of claim 15 wherein the application identifier, the sequence of random numbers each include a binary string.

18. The system of claim 17 wherein the size of the application identifier, the sequence of random numbers, and the serial number key are the same.

19. The system of claim 18 wherein the decoder is configured to decode the serial number with a base-32 ASCII decoder.

20. A computer-implemented method comprising:
concatenating an application identifier and a sequence of random numbers to create a first concatenated string;

generating a signature string by encrypting the first concatenated string comprising the application identifier and the sequence of random numbers using an encryption means;

generating a serial number by concatenating the signature string with the application identifier and the sequence of random numbers, wherein concatenating the signature string with the application identifier and the sequence of random numbers creates a second concatenated string; and encoding the second concatenated string comprising the signature string, the application identifier, and the sequence of random numbers to encode the serial number.

21. The computer-implemented method of claim 20 further comprising:

decoding the serial number to generate a concatenated string comprising an application identifier, a sequence of random numbers, and a signature;

generating a sample signature by encrypting the application identifier and the sequence of random numbers with the encryption means; and comparing the sample signature that is generated by encrypting the application identifier and the sequence of random numbers with the signature that is generated by decoding the serial number to determine a validity of the serial number.

22. The computer-implemented method of claim 20 wherein the encryption means includes a public key cryptography, a signature algorithm, or a block cipher with a key cipher.

* * * * *